United States Patent

Sluijter et al.

[15] 3,701,852

[45] Oct. 31, 1972

[54] TRANSMISSION SYSTEM AND ASSOCIATED TRANSMITTERS AND RECEIVERS FOR THE TRANSMISSION OF SYNCHRONOUS PULSE SIGNALS

[72] Inventors: Robert Johannes Sluijter; Petrus Josephus Van Gerwen, both of Emmasingel, Eindhoven, Netherlands

[73] Assignee: U.S. Philips Corporation, New York, N.Y.

[22] Filed: Aug. 23, 1971

[21] Appl. No.: 173,877

[30] Foreign Application Priority Data

Aug. 29, 1970 Netherlands.............7012827

[52] U.S. Cl..............179/15 FS, 179/15 BM, 325/50

[51] Int. Cl...............................................H04b 1/00

[58] Field of Search.....179/15 BM, 15 FS; 325/38 A, 325/47, 50

[56] References Cited

UNITED STATES PATENTS

| | | | |
|---|---|---|---|
| 3,492,580 | 1/1970 | Berman | 325/50 |
| 3,495,188 | 2/1970 | Kopp | 179/15 FS |

*Primary Examiner*—Ralph D. Blakeslee
*Attorney*—Frank R. Trifari

[57] ABSTRACT

A transmission system for the transmission of binary synchronous pulse signals in the base group of a carrier telephony system in which these pulse signals are converted into two separate pulse signals, at half the original information speed each, which separate pulse signals are each modulated in accordance with a single sideband method on carrier signals of different frequencies located on either side of the central portion of the transmission band (base group) so that the transmitted frequency spectrum is constituted by the two non-adjacent single sideband signals.

13 Claims, 11 Drawing Figures

Figure 1:
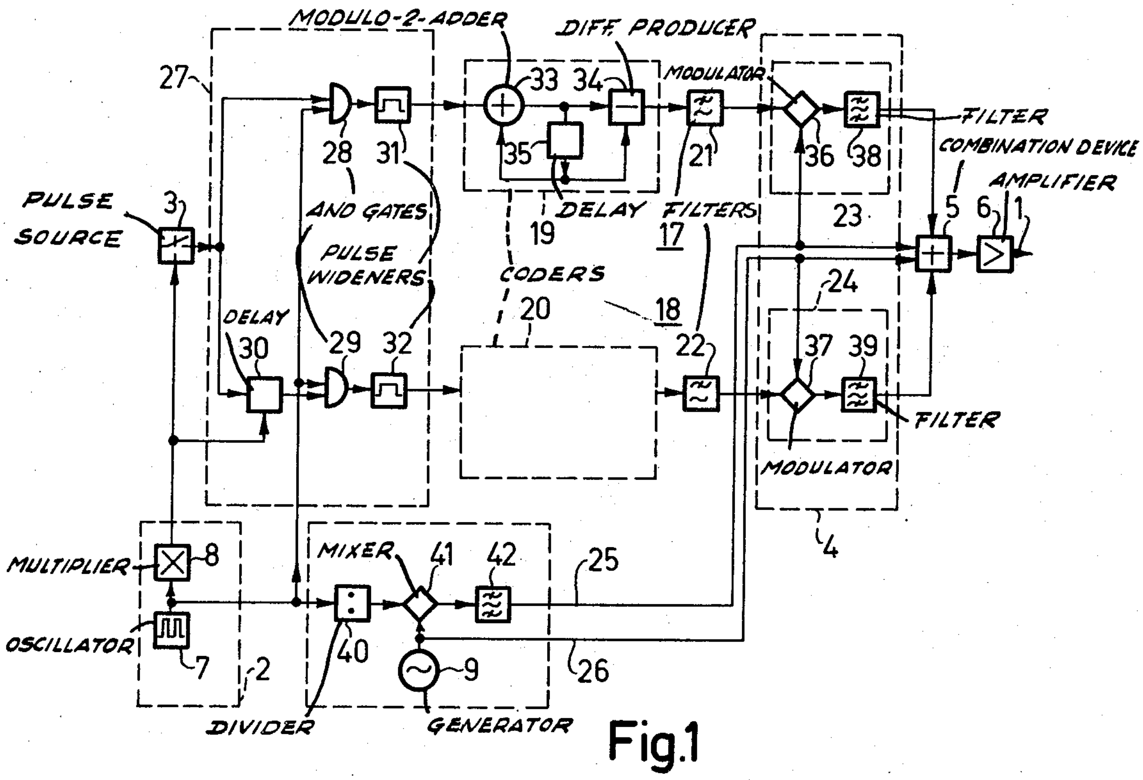

INVENTORS
ROBERT J. SLUYTER
PETRUS J. VAN GERWEN

BY

AGENT

INVENTORS
ROBERT J. SLUYTER
PETRUS J. VAN GERWEN

BY

AGENT

INVENTORS
ROBERT J. SLUYTER
PETRUS J. VAN GERWEN
BY
AGENT

INVENTORS
ROBERT J. SLUYTER,
PETRUS J. VAN GERWEN

BY

AGENT

INVENTORS
ROBERT J. SLUYTER
PETRUS J. VAN GERWEN

BY

AGENT

TRANSMISSION SYSTEM AND ASSOCIATED TRANSMITTERS AND RECEIVERS FOR THE TRANSMISSION OF SYNCHRONOUS PULSE SIGNALS

The invention relates to a transmission system and associated transmitters end receivers for the transmission of binary pulse signals in a prescribed transmission band within which the pulses coincide with the pulses of a clock signal having a given clock frequency, said pulse signals being modulated on a carrier signal in a modulator at the transmitter end and at the receiver end being demodulated in a demodulator the output signal of which is applied to a pulse regenerator, while pilot signals are co-transmitted with the pulse signals modulated on the carrier signal, which pilot signals are selected at the receiver end in a pilot circuit so as to generate a local carrier and clock signal.

In order to be able to take an unambiguous decision regarding the presence or absence of a pulse in the transmitted pulse signal at the receiver end in such transmission systems, special attention must be given to the delay time characteristic of the transmission path. Particularly the requirements to be imposed on the delay time characteristic become more stringent when the information speed is very high. In fact, a high information speed necessarily results in a reduction of the pulse duration of the pulses to be transmitted so that frequency components of higher frequencies are introduced which are greatly influenced by the delay time differences in the transmission path.

When transmitting pulse signals having a high information speed in the base group of a carrier telephony system having a bandwidth of 48 kHz serious difficulties are experienced; in fact, it has been found that the delay time characteristic turned out to be very unfavorable for the high information speed of, for example, 48 kilobits/sec. Not only is the delay time characteristic of carrier telephony systems degraded by the use of bandpass filters and pilot cut-off filters, but also by the group switching filters conventionally used in international communications, which filters have a very poor delay time characteristic. Thus, in the base band of a carrier telephony communication delay time differences of 100 $\mu$sec were measured which are even considerably larger than the duration of the pulses of 21 $\mu$sec to be transmitted.

An object of the present invention is to provide a transmission system of the kind described in the preamble is suitable for pulse transmission in the base group of a carrier telephony system and which with its flexibility in use and its simplicity in structure is distinguished by a minimum sensitivity to the delay time characteristic of the transmission path. Thus, it was found that for the transmission of pulse signals at an information speed of 48 kilobits/sec, it was not necessary to use delay time equalizing networks, while even in case of a 100 percent increase of the information speed a very light delay time equalization due to the use of a seven-level coding was already found to be amply sufficient to guarantee optimum receiving conditions.

The transmission system according to the invention is characterized in that the modulator is constituted by a dual single sideband modulator consisting of two parallel-arranged channels binary pulse signals being applied to said channels each channel including a coder for converting the applied binary pulse signals into multilevel pulse signals, while a lowpass filter and a single sideband modulator are connected in cascade to the output of each coder, said single sideband modulators being controlled by mutually different carrier signals having frequencies located on either side of the center of the transmission band, the outputs of said single sideband modulators being applied to a combination device to produce a dual single sideband signal constituted by the two single sideband signals at the outputs of the single sideband modulators and having a frequency space left around the center of the transmission band for the transmission of two pilot signals, the ratio of the clock frequency and the frequency difference of the two pilot signals being given by an integer, the demodulator in the receiver being constituted by a dual single sideband demodulator comprising two single sideband demodulators the received dual single sideband signal being applied to each of said demodulators, each single sideband demodulator being controlled by a local carrier signal said carrier signals having mutually different frequencies, the output of each single sideband demodulator being connected to a decoder controlled by a local clock signal which together with the two local carrier signals is derived in the pilot circuit from the received pilot signals.

Simultaneously, with the minimum sensitivity to the delay time characteristic of the transmission path at the high information speed of 48 kilobits/sec of the pulse transmission in the base group of a carrier telephony system, the use of the steps according to the invention also results in a considerable frequency division of the frequency band of the base group. For example, this frequency division creates the possibility of an undisturbed transmission of all internationally standardized pilot signals in the base group of a carrier telephony system, particularly the pilot signals of approximately 84, 104 and 64 kHz and four speech channels each having a bandwidth of 4 kHz can be incorporated in the base group. As a result an optimum utilization of the available frequency band is obtained while it is found that the different signals in the base group are not influenced.

Figure 2:
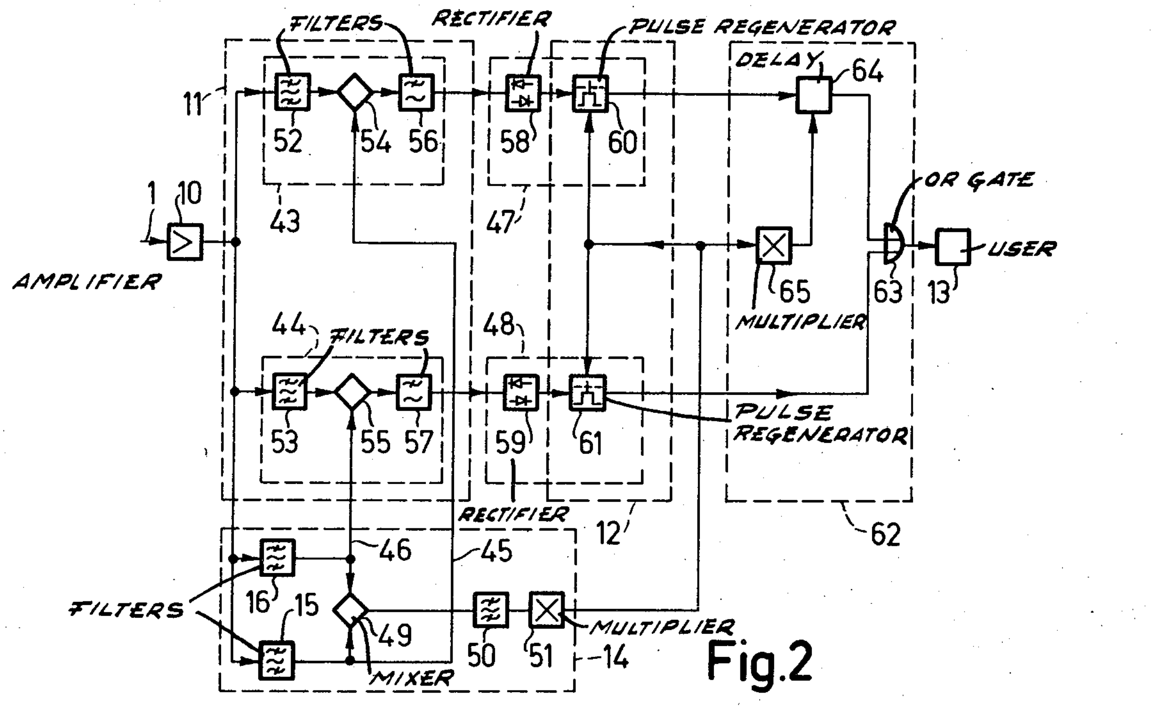
Figure 3A:
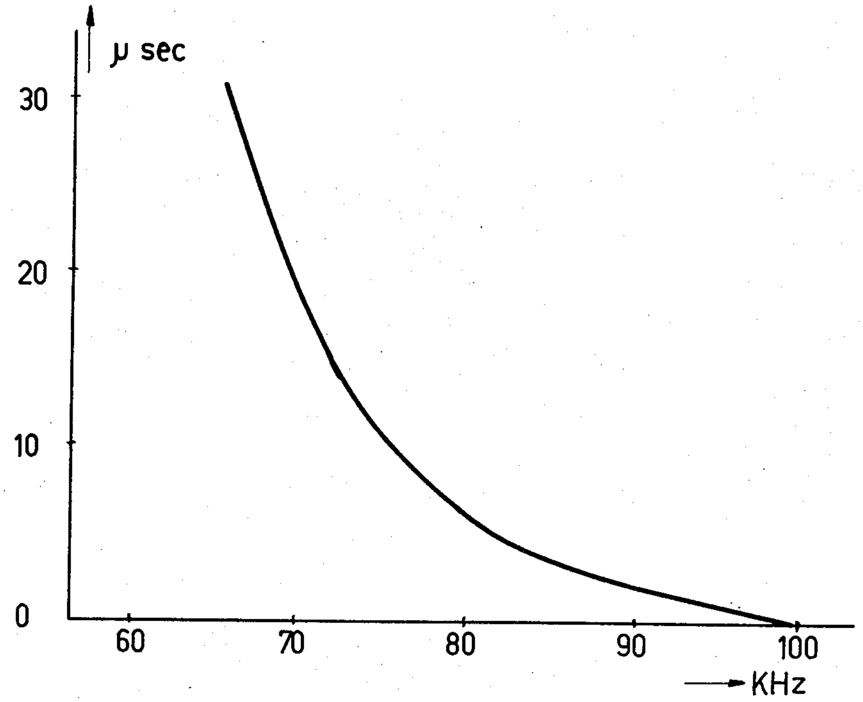
Figure 3B:
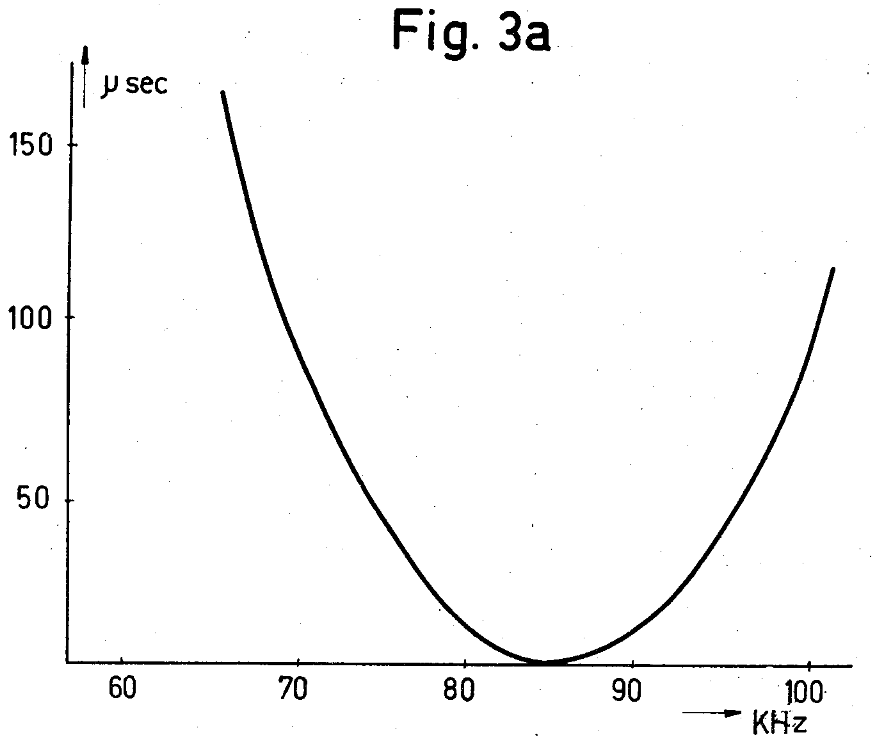
Figure 4:
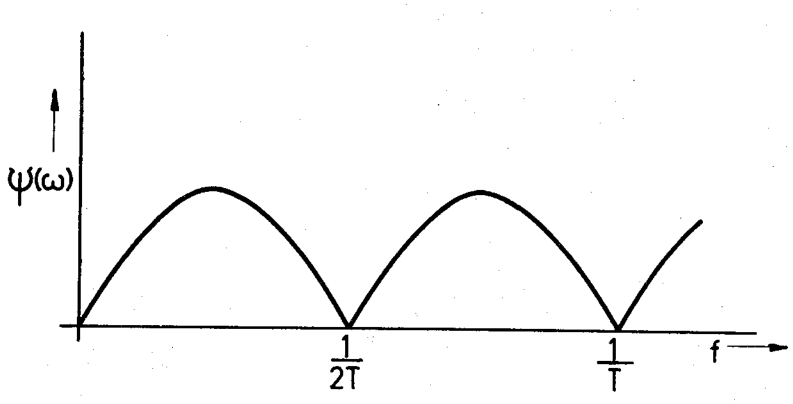
Figure 5:
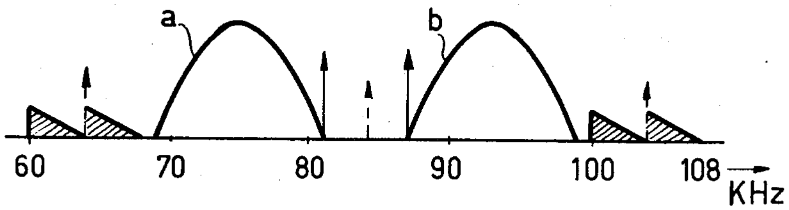
Figure 6A:
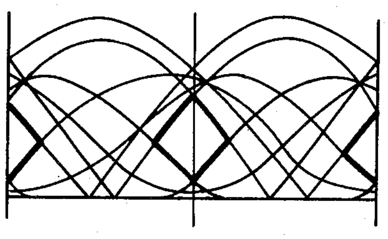
Figure 6B:
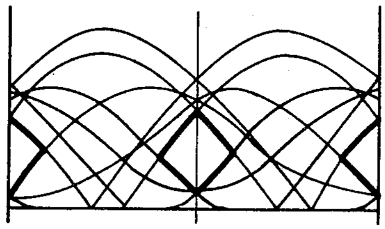
Figure 6C:
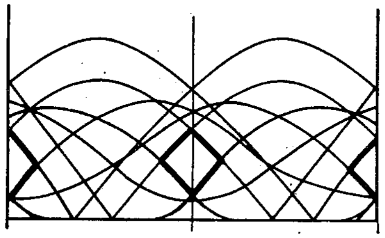
Figure 7:
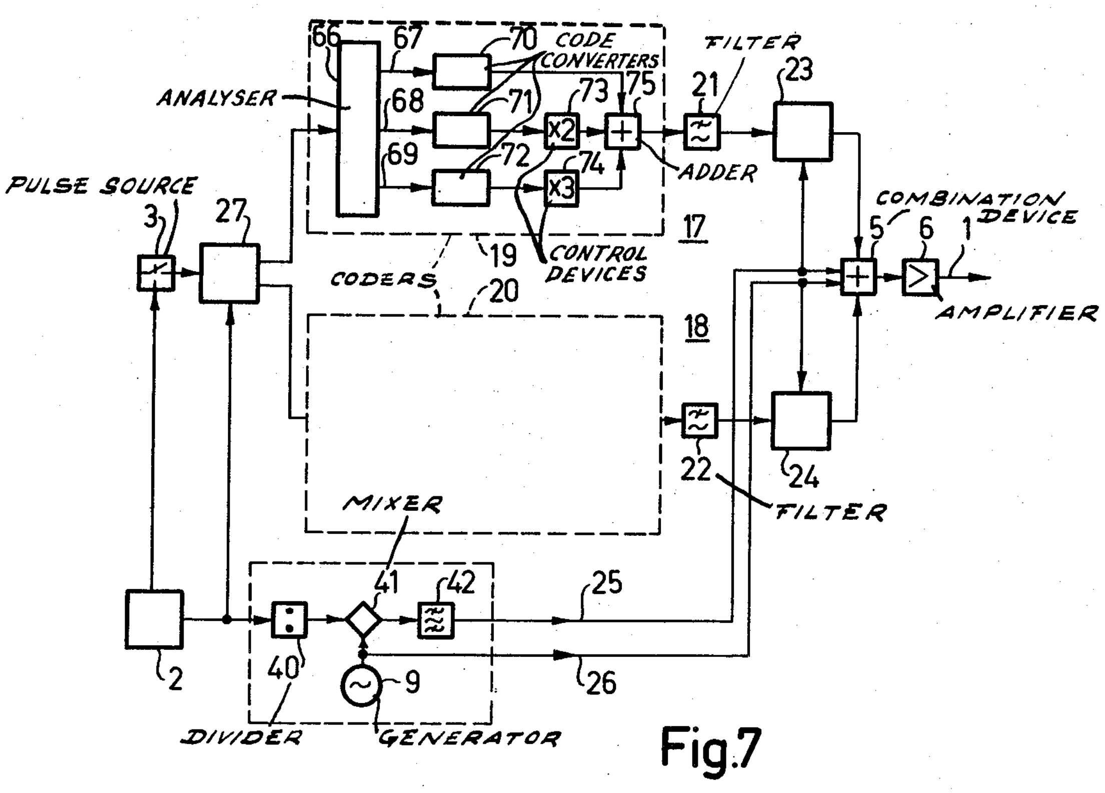
Figure 8:
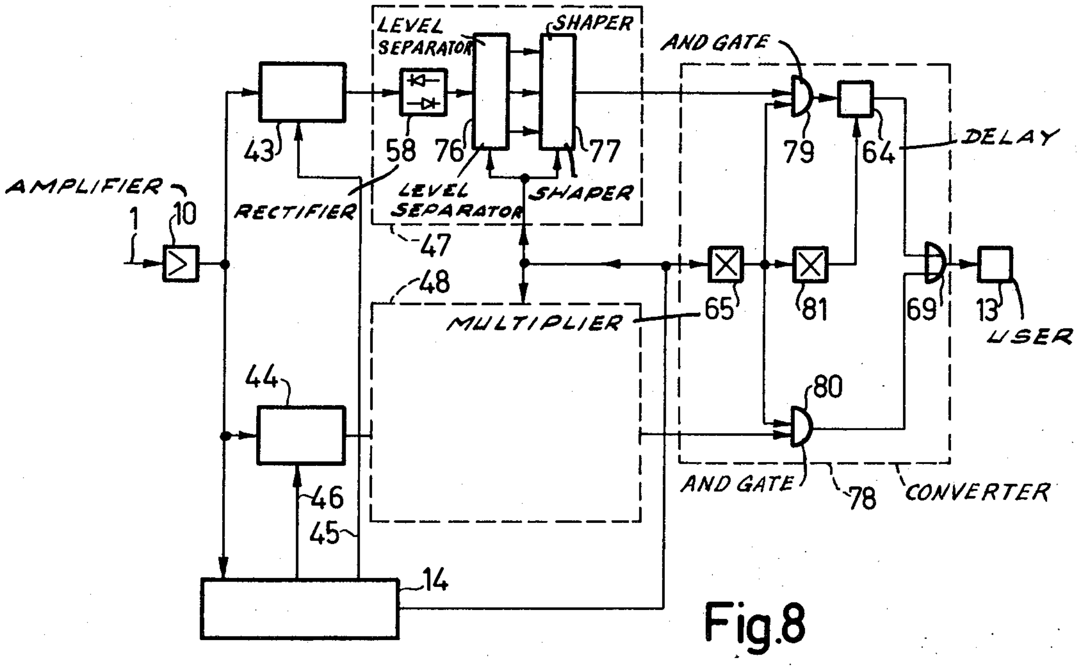

In order that the invention may be readily carried into effect, some embodiments thereof will now b described in detail, by way of example with reference to the accompanying diagrammatic drawings, in which:

FIGS. 1 and 2 show a transmitter and a receiver according to the invention while FIGS. 3*a* and 3*b* show delay time cjaracteristics of a transmission path, FIG. 4 shows the amplitude-versus-frequency characteristic of the coder constituted as a pseudoternary code converter, while FIG. 5 shows a frequency spectrum of the transmitted dual single sideband signal;

FIGS. 6*a*–6*c* shows a number of eye patterns of the transmission system, while FIGS. 7 and 8 show modifications of a transmitter and a receiver according to FIG. 1, and according to FIG. 2, respectively, for the transmission of seven-level signals.

The transmitter shown in FIG. 1 according to the invention is adapted for the transmission of binary pulse signals at an information speed of 48 kilobits/sec. via a transmission path 1 in the frequency band of from 60 to 108 kHz of the base group of a carrier telephony system. In the embodiment shown, the binary pulse signals are derived from an information pulse source 3 controlled by a clock pulse generator 2 and are introduced into the frequency band of from 60 and 108 kHz by means of a modulator 4 whose output signal is transmitted to the receiver shown in FIG. 2 after combination with pilot signals in a combination device 5 through an output amplifier, The clock pulse generator 2 comprises a clock pulse oscillator 7 having a frequency of, for example, 24 kHz whose output line incorporates a frequency multiplier 8 the output pulses of which control the information pulse source 3 at a frequency of 48 kHz, while the pilot signals are derived from the clock pulse oscillator 7 and a generator 9.

In the cooperating receiver according to FIG. 2, the received carrier-modulated pulse signals are applied through a receiver amplifier 10 to a demodulator 11 followed by a pulse regenerator 12 for the purpose of pulse regeneration in accordance with shape and instant of occurrence, which demodulated and regenerated pulse signals are applied to a user 13. For the local recovery of carrier and clock signal for demodulation and pulse regeneration, respectively, of the received signal the co-transmitted pilot signals are selected in a pilot circuit 14 by means of pilot filters 15, 16.

In the described transmission system adapted for the transmission of pulse signals at an information speed of 48 kilobits/sec, the accuracy of the pulse resolution in the pulse regenerator is very much dependent on the delay time characteristic of the transmission path. For the transmission of pulse signals in the base band of a carrier telephony system, this delay time characteristic has a very detrimental variation which is not only caused by the bandpass filters and pilot cut-off filters incorporated in the carrier telephony system but also by the group switching filters exhibiting a delay time characteristic which is very detrimental for pulse transmission.

For the purpose of illustration, FIGS. 3*a* and 3*b* show delay time characteristics of the base group of a carrier telephony communication. A communication free from group switching filters has the characteristic of FIG. 3*a*, whereas a communication which has passed a cascade circuit of two group switching filters has the characteristic of FIG. 3*b*. As is apparent from the delay time characteristic of FIG. 3*a*, delay time differences of 22 $\mu$sec occur in the frequency band of from 68 to 100 kHz used for pulse transmission. These differences are of the same order as the pulse duration of 21 $\mu$sec of the pulses to be transmitted, whereas these delay time differences may even assume values of 120 $\mu$ sec. when using group switching filters in the carrier telephony communication, as is apparent from FIG. 3*b*.

In spite of these large delay time differences, it is found that with the transmission system according to the invention and with its simplicity in equipment and without using delay time equalizing networks a satisfactory pulse resolution in the pulse regenerator can still be realized in that the modulator 4 at the transmitter end is constituted by a dual single sideband modulator consisting of two parallel arranged channels 17 and 18 each of which receives a binary pulse signal and each of which is provided with a coder 19, 20 for converting the binary pulse signals into multi-level pulse signals, while lowpass filters 21, 22 and single sideband modulators 23, 24 are connected in cascade to the outputs of each of the decoders 19, 20, carrier signals being applied to the two single sideband modulators 23, 24 through lines 25, 26 at frequencies of, for example, 87 and 81 kHz located on either side of the central portion of the transmission band of from 60 to 108 kHz, the output signals of said single sideband modulators 23, 24 being applied to the combination device 5.

In the embodiment shown, the above-mentioned binary pulse signals are derived from the information pulse source 3 through a series-parallel converter 27. This series-parallel converter is constituted by AND gates 28, 29, the information pulses originating from the information pulse source 3 being applied directly to the AND gate 28 and through a delay network 30 controlled by the output pulses from the frequency multiplier 8 to the AND gate 29. These AND gates 28, 29 are controlled by the output pulses from the clock pulse oscillator 7, so that the consecutive information pulses are alternately derived from the AND gates 28 and 29 and are applied through pulse wideners 31, 32 to the coders 19, 20, respectively. In this embodiment these coders are constituted by pseudo-ternary code converters which convert the binary pulse signals into ternary pulse signals and, as is shown for the code converter 19 in greater detail, are constituted by a modulo-2-adder 33 whose output signal is applied at one end to a difference producer 34 and at the other end through a delay network 35 having a delay time of two periods T of the clock-pulse oscillator 7, to a second input of both the modulo-2-adder 33 and of the difference producer 34.

As has been extensively described elsewhere and as can be directly derived from a simple mathematical consideration, the amplitude-versus-frequency characteristic $\Psi(\omega)$ of the transfer function of these pseudoternary code converters 19, 20 has the shape as is shown in FIG. 4, with spectral zeros for the direct current term and for the integral multiples of the frequency 1 /2T. For the embodiment shown in which the frequency of the clock pulse oscillator 7 is 24 kHz, the first spectral zeros therefore occur for the frequencies $f = 0$ and $f = 12$ kHz.

By suppressing the spectrum components above the frequency of 12 kHz by means of the lowpass filters 21, 22 a signal occurs at the output thereof in the frequency band of from 0 to 12 kHz, which signal is particularly suitable for signal sideband modulation. To this end the output signals from the lowpass filters 21, 22 are applied to the single sideband modulators 23, 24, respectively, each comprising a cascade circuit of push-pull modulators 36, 37 and single sideband filters 38, 39, respectively, connected thereto, said push-pull modulators 36, 37 being fed by the carrier signal of the frequencies 87 kHz and 81 kHz, respectively, and the passbands of the single sideband filters 38, 39 ranging from 87 to 99 kHz and from 69 to 81 kHz, respectively.

As a result of the modulation of the two pulse signals located in the frequency band of from 0 to 12 kHz on the carrier signals of 87 and 81 kHz, these pulse signals occur at the outputs of the single sideband modulators 23, 24 in the frequency band of from 87 TO 99 kHz, which pulse signals are applied for further transmission to the combination device 5 from whose output a dual single sideband signal is derived which consists of the two single sideband signals derived from the single sideband modulators 23, 24 in the frequency bands of from 87 to 99 kHz and from 69 to 81 kHz, while the central portion of the transmission band of from 60 to 108 kHz leaves a frequency space of 6 kHz which ranges from 81 to 87 kHz for the transmission of pilot signals of, for example, the same frequency as the carrier signals of 81 and 87 kHz, which pilot signals are transmitted through the line for the local recovery of carrier and clock signals at the receiver end.

The carrier signals of 81 and 87 kHz are derived from the clock pulse oscillator 7 of 24 kHz and the oscillator 9 which provides a signal at a fixed frequency of 81 kHz which thus directly constitutes the carrier signal of 81 kHz, while the carrier signal of 87 kHz is obtained by applying the output pulses from the clock pulse oscillator 7 to a frequency divider 40 having a division factor of 4 and by mixing the signal of 6 kHz obtained in this manner with the signal of 81 kHz from the oscillator 9 in a mixer stage 41 including an output filter 42.

In this manner, the local carrier signals and the clock signal can be recovered in a simple manner at the receiver end, for the frequency of the two local carrier signals is equal to that of the pilot signals and the frequency of the local clock signal is obtained by multiplication of the frequency difference of 6 kHz of the two pilot signals by a factor of 4. In addition, the lowpass filters 21, 22 and the single sideband filters 38, 39 are simple as a result of the particularly favorable amplitude-versus-frequency characteristic $\Psi$ ($\omega$) of the pseudo-ternary code converters, while in addition the large frequency space of 6 kHz between the two transmitted frequency bands of 69 – 81 and 87 – 99 kHz still permits an additional simplification of the single sideband filters 38, 39; in fact, only the portion of the lower sideband of the output signal of modulator 36 located in the frequency band of from 69 to 81 kHz is to be fully suppressed by the single sideband filter 38 so as to avoid crosstalk between the channels 17 and 18 and only the portion of the upper sideband of the output signal of modulator 37 located in the frequency band of from 87 TO 99 kHz is to be fully suppressed by the single sideband filter 39. Due to their simplicity in construction these filters do not introduce phase shifts which noticeably influence the pulse resolution in the pulse regenerator 12 at the receiver end.

Simultaneously with the mentioned insensitivity to the delay time characteristic at the high information speed of 48 kilobits/sec of the pulse signals to be transmitted the use of the steps according to the invention results in a remarkable frequency division of the frequency band of the base group of from 60 to 108 kHz as may be apparent from the frequency diagram shown in FIG. 5 of the signals transmitted by the transmitter according to FIG. 1. The curves *a* and *b* in FIG. 5 show the shape of the frequency spectra of the modulated pulse signals in the frequency bands of from 69 to 81 kHz and from 87 to 99 kHz, the solid-line arrows representing the carrier frequencies of 81 and 87 kHz co-transmitted as pilot signals.

This frequency division creates the possibility of an undisturbed transmission of all internationally standardized pilot signals in the base group of the carrier telephony system, particularly the pilot signals of approximately 84, 104 and 64 kHz which are denoted by the broken line arrows in this FIG. 5, while four speech channels can be transmitted in the band of from 60 to 69 kHz and from 99 to 108 kHz, which channels are denoted by the shade areas. Frequency spaces of a few kHz which are sufficient to ensure only a slight influence of these pilot signals and speech channels by the components of the pulse signals are introduced between the pilot signals of 84, 104 and 64 kHz and the speech channels of 60 – 69 kHz and 99 – 108 kHz on the one hand and the frequency spectra of the modulated pulse signals in the frequency band of from 69 to 81 KHz and 87 to 99 kHz on the other hand. Optionally, any influence may be eliminated by incorporating cut-off filters in the output circuits of the push-pull modulators 36, 37, which filters are tuned to the frequencies of the pilot signals of 84, 104 and 64 kHz and to the speech channels of from 60 to 69 kHz and 99 to 108 kHz. These cut-off filters do not influence the pulse transmission as a result of the frequency spaces of a few kHz.

In practice the cut-off filters may be included in the single sideband filters 38, 39. In case of an optimum utilization of the available frequency band, a mutual influence of the different signals in the transmission band is thus eliminated.

In the cooperating receiver of FIG. 2, the demodulator 11 is constituted as a dual single sideband demodulator consisting of two single sideband demodulators 43, 44 to which the received dual single sideband signal is applied in a parallel arrangement, each single sideband demodulator 43, 44 being controlled through lines 45, 46 by a separate local carrier signal of 87 and 81 kHz, respectively, while decoders 47, 48 controlled by a local clock signal of 24 kHz are connected to the outputs of each of the single sideband demodulators, which local clock signal together with the two local carrier signals is derived in the pilot circuit 14 from the received pilot signals of 81 and 87 kHz for which purpose the two pilot signals of 87 and 81 kHz are selected by the pilot filters 15, 16 in this embodiment from the received dual-single sideband signal and are applied as carrier signals in the manner mentioned above to the single sideband demodulators 43, 44 and are mixed in a mixer stage 49 including an output filter 50 to generate the local clock signal and to generate the difference frequency of 6 KHz which after frequency multiplication in a frequency multiplier 51 by a multiplication factor of 4 provides the clock frequency of 24 kHz of the transmitted pulse signals.

In this case, the single sideband demodulators 43, 44 are constituted by a cascade arrangement of input filters 52, 53 in the form of bandpass filters, push-pull modulators 54, 55 and a lowpass filter having a cut-off frequency of, for example, 12 kHz. The input filters 52, 53 then select from the receiver dual-single sideband signal the single sideband signals located in the frequency bands of from 87 to 99 kHz and from 69 to 81 kHz, respectively, which single sideband signals provide ternary pulse signals in the frequency band of from 0 to 12 kHz after demodulation for the outputs of the low-pass filters 56 and 57. These ternary pulse signals are converted in the decoders 47, 48 by means of two phase rectifiers 58, 59 into binary pulse signals whose pulses are regenerated in accordance with shape and instant of occurrence, in pulse regenerators 60, 61 controlled by the clock signal of 24 kHz.

For recovering the original binary pulse signal having an information speed of 48 kilobits/sec, the outputs of the decoders 47 and 48 are applied to a parallel-series converter 62 consisting of an OR gate 63 to which the output signal from the decoder 48 is applied directly and to which the output signal from the decoder 47 is applied through a delay network 64. The delay network 64 is constituted by a shift register element which is controlled by a clock signal of 48 kHz is derived from the clock signal of 24 kHz by multiplication in a frequency multiplier 65 by a multiplication factor of 2. The original information signal which is applied to the user 13 is obtained at the output of the OR gate 63.

When pulse signals having an information speed of 48 kilobits/sec and originating from the transmitter shown in FIG. 1 are transmitted to the cooperating receiver of FIG. 2 through a transmission path having a delay time characteristic illustrated in FIG. 3*a*, the remarkable result found is that, in the absence of delay time equalizing network, the pulse resolution of the pulses in the output signal from the two-phase rectifiers 58, 59 is degraded only slightly by the particularly unfavorable delay time characteristic. This degradation of the pulse resolution by the delay time characteristic will now be further illustrated with reference to the eye patterns shown in FIG. 6.

FIG. 6*a* shows the eye pattern of the described transmission system in the case of transmitting the pulse signals over a transmission path having an ideal delay time characteristic; this means a constant delay time over the entire transmission band, As is known, the pulse resolution is given by the inner contour of the eye pattern also sometimes called eye opening; particularly the height of the eye opening characterizes the resolution relative to the amplitudes of the pulses in the pulse signal while the width of the eye opening characterises the resolution relative to the mutual distance of the consecutive pulses in the pulse signal. For the quality and the sensitivity to interference the pulse resolution and hence the eye opening is of special importance, for the size of the eye opening is a measure of the magnitude of an occuring interference which can be allowed before a change of level is brought about.

FIG. 6*b* shows the eye pattern of the pulse signals transmitted by the transmission system in the band of from 69 to 81 kHz, which transmission has taken place over a transmission path having the delay time characteristic shown in FIG. 3*a* and having delay time differences of 16.5 $\mu$ sec which are larger than the delay time differences of 3 $\mu$sec. in the band of from 87 to 99 kHz.

Both the height and the width of the eye opening are reduced by this delay time characteristic; however, this is only a minimum reduction of the eye opening. Particularly the height and the width of the eye opening are found to have decreased by approximately 10 and 4 percent, respectively, which corresponds to a reduction of 0.9 dB of the sensitivity to interference of the transmission system.

Even a transmission path having the delay time characteristic shown in FIG. 3*b* only little influences the quality of the pulse transmission as is apparent from the eye pattern of FIG. 6*c*. This eye pattern is the pattern of the transmitted pulse signals in the frequency band of from 69 to 81 kHz in which frequency band delay time differences of 94 $\mu$sec. occur as is apparent from the delay time characteristic of FIG. 3*b*. In spite of the fact that these differences are a few times larger than the delay time differences which follow from FIG. 3*a*, they reduce the height and the width of the eye opening of FIG. 6*a* by only 24 and 20 percent, respectively, which corresponds to a reduction of only 2.4 dB of the sensitivity to interference so that a high-quality pulse transmission is always ensured also in this case without the use of delay time equalizing networks.

The frequency spectra of the transmitted pulse signals are brought to such a shape and are localized in the base group in such a manner by the frequency division of the base group shown in FIG. 5 that, as is apparent from the eye patterns of FIG. 6, the quality of the transmission of pulse signals at a high information speed is independent to a large extent of the delay time characteristic of the transmission path.

Both effects in common are of special importance for rendering the pulse transmission system according to the invention suitable in carrier telephony systems, for an undisturbed transmission of all internationally standardized pilot signals in the base group is ensured on the one hand, and a satisfactory quality of the pulse transmission is ensured on the other hand which is greatly independent of the quality of the transmission path so that delay time equalizing networks may be omitted. Particularly in case of switched communications, the last-mentioned property is very advantageous because the complicated automatic delay time equalizing equipment is omitted. Together with the advantage as regards the technique of the equipment such as the little critical structure, simple filter constructions and simple carrier and clock signal regeneretion the described transmission system is particularly suitable for its practical realisation.

Since the quality of the pulse transmission is largely independent of the delay time differences which are introduced by the transmission path, the transmission system according to the invention is likewise suitable for multilevel transmission of pulse signals, for example, transmission of seven-level pulse signals which are used when transmitting binary pulse signals at a higher information speed than 48 kilobits/sec in the available frequency band. Particularly binary pulse signals are transmitted at an information speed of 96 kilobits/sec with the aid of seven-level coding. As compared with the advantage of increasing the transmission speed from 48 to 96 kilobits/sec, there is the advantage that for the transmission of seven-level pulse signals the transmission system becomes considerably more sensitive to delay time differences introduces by the transmission path. In fact, whereas in the transmission system according to FIGS. 1 and 2, only two levels need be distinguished in the output signal from the two-phase rectifiers 58, 59, four levels are to be distinguished when transmitting seven-level pulse signals at the outputs of the two-phase rectifiers 58, 59, which becomes manifest in the eye pattern by three eye openings located one above the other.

In spite of the considerable increase of the sensitivity of the transmission system to the delay time characteristic of the transmission path in case of multilevel pulse transmission, it is found that a considerably simpler delay time equalization relative to known systems is sufficient to realize an eye pattern and thereby ensure an accurate pulse regeneration. FIGS. 7 and 8 show block schematic diagrams of a transmitter and a receiver for multilevel transmission in which the transmission system as already extensively described in prior U.S. Pat. application Ser. No. 111,378, filed Feb. 1, 1971 can advantageously be used.

The transmitter shown in FIG. 7 adapted for the transmission of a seven-level signal differs only from the transmitter of FIG. 1 in the construction of the coders 19, 20 of which the coder 19 is shown in greater detail. As in the transmission system described in the abovementioned Netherlands patent application, the coders 19, 20 are adapted for converting a binary signal into a seven-level signal and are built up from a pulse group analyzer 66 provided with three parallel output lines 67, 68, 69 each accommodating a pseudoternary code converter 70, 71, 72 and an amplitude control device 73, 74 arranged in cascade with the pseudo-ternary code converters 71, 72 which output lines are further connected to a linear combination device 75.

To obtain the frequency spectrum shown in FIG. 5 of the output signal from the transmitter of FIG. 7, the pseudo-ternary code converters are constituted in the same manner as shown in and described with reference to FIG. 1.

Adjoining pulse groups consisting of two binary pulses of the pulse signals applied to the coder are analyzed by the pulse group analyzer 66 and a pulse is applied only to an output line characteristic of the analyzed pulse group. When, for example, the pulse group (0,1) coccurs at the input of the coder, the output lines 67, 68, 69 assume the logical values 1, 0, 0, respectively; in case of a pulse group (1,1) the output lines 67, 68, 69 assume the logical values 0, 1, 0, respectively and for a pulse group (1,0) the output lines 67, 68, 69 assume the logical values 0, 0, 1, respectively, while for a pulse group (0,0) at the input of the pulse group analyzer 66 all output lines assume the logical value "0". Binary pulse series occur in the output lines 67, 68, 69, which pulse series are converted by the pseudo-ternary code converters 70, 71, 72 into ternary pulse series within which the pulses assume the three amplitude levels −1, 0, +1. The amplitudes of the pulse series at the outputs of the pseudo-ternary code converters 71 72 are multiplied by the amplitude control devices 73, 74 by a factor of 2 and 3, respectively, so that pulse series occur at the outputs of the amplitude control devices 73, 74 within which the pulses assume the amplitude levels −2, 0, +2 and −3, 0, +3, respectively. A pulse series within which the pulses assume the seven amplitude levels −3, −2, −1, 0, 1, 2, 3 is then derived from the output of the linear adder 75. These seven-level signals are conditioned for transmission to the receiver according to FIG. 8 in a manner analogous to the one described with reference to FIG. 1.

The cooperating receiver of FIG. 8 differs only from the receiver of FIG. 2 in the construction of the decoders 47, 48 and of the parallel-series converter 78. Likewise as the decoder in the receiver of the transmission system according to the above-mentioned patent application, the decoders 47, 48, of which the decoder 47 is shown in greater detail, are provided with a cascade arrangement of the two-phase rectifier 58 and a level separator 76 controlled by the local clock signal of 24 kHz and including three parallel output lines which are connected to a pulse group shaper 77 likewise controlled by the local clock signal. The seven-level signal having the amplitude levels −3, −2, −1, 0, 1, 2, 3 is converted by the two-phase rectifier 58 into a four-level signal having the amplitude level 0, 1, 2, 3. When the levels 0, 1, 2, 3 occur in the four-level signal a pulse having a duration of, for example, 1/48 m.sec. is applied to 0, 1, 2 and 3 output lines, respectively, of the level separator. The pulses occurring simultaneously at the output lines of the level separator 76 are converted by the pulse group shaper 77 into pulse groups each comprising two binary pulses. Particularly the pulse group shaper 77 provides the pulse group (0,0), (0,1), (1,1), (1,0) when a pulse occurs simultaneously at 0,1,2 and 3 input lines, respectively, of the pulse group shaper 76. For recovering the original information pulse series within which the pulses have a duration of 1/96 m.sec. the pulse series occurring at the outputs of the decoders 47, 48 within which series the pulses have a duration of 1/48 m.sec. are applied in a parallel-series converter 78 to AND gates 79, 80 which are controlled by a clock signal of 48 kHz which is derived from the local clock signal of 24 kHz by means of the frequency multiplier 65. The pulse series obtained in this manner at the output of the AND gate 80 is directly applied to the OR gate 63, and the pulse series at the output of the AND gate 79 is applied through the shift register element 64 to the OR gate 63. In contrast with the shift register element 64 of FIG. 1, this shift register element is controlled in this embodiment by a clock signal of 96 kHz which is derived from the clock signal of 48 kHz by means of a frequency multiplier 81 having a multiplication factor 2. The original information pulse signal obtained at the output of the OR gate 63 is again applied to the user 13.

It is to be noted that for obtaining the two single sideband signals not only the method of modulation as described with reference to FIG. 1, but also the single sideband modulation method as extensively described in prior U.S. Pat. application No. 6,514,831 Ser. No. 594,615, filed Nov. 15, 1966 or Ser. No. 786,111, filed Dec. 23, 1968 now U.S. Pat. No. 3,588,702 may be used. It is likewise possible to convert the binary pulse signals into ternary pulse signals with the aid of the described pseudo-ternary code converters and to perform the subsequent filtering of the ternary pulse signals in the low-pass filters shown by using the digital filter described in the aforementioned U.S. Pat. Application Ser. No. 594,615, now U.S. Pat. No. 3,500,215.

Apart from the transmission of one information signal at an information speed of 48 kilobits/sec in the manner as described with reference to FIGS. 1 and 2, it is alternatively possible to transmit two independent information signals at an information speed of 24 kilobits/sec each. To this end, these independent information signals are directly applied to the channels 17 and 18 of FIG. 1.

What is claimed is:

1. A transmission system for the transmission of binary pulse signals in a prescribed transmission band within which the pulses coincide with the pulses of a clock signal having a given clock frequency, said pulse signals being modulated on a carrier signal in a modulator at the transmitter end and at the receiver end being demodulated in a demodulator the output signal of which is applied to a pulse regenerator, while pilot signals are co-transmitted with the pulse signals modulated on the carrier signal, which pilot signals are selected at the receiver end in a pilot circuit so as to generate a local carrier and clock signal, characterized in that the modulator is constituted by a dual single sideband modulator, comprising two parallel-arranged channels binary pulse signals being applied to said channels, each channel including a coder for converting the applied binary pulse signals into multilevel pulse signals, while a lowpass filter and a single sideband modulator are connected in cascade to the outputs of each coder, said single sideband modulators being controlled by mutually different carrier signals having frequencies located on either side of the center of the transmission band, the outputs of said single sideband modulators being applied to a combination device to produce a dual single sideband signal constituted by the two single sideband signals at the outputs of the single sideband modulators and having a frequency space left around the center of the transmission band for the transmission of two pilot signals, the ratio of the clock frequency and the frequency difference of the two pilot signals being given by an integer, the demodulator in the receiver being constituted by a dual single sideband demodulator comprising two single sideband demodulators the received dual single sideband signal being applied to each of said demodulators, each single sideband demodulator being controlled by a local carrier signal, said carrier signals having mutually different frequencies the output of each single sideband demodulator being connected to a decoder controlled by a local clock signal which together with the two local carrier signals is derived in the pilot circuit from the received pilot signals.

2. A transmitter suitable for use in a transmission system as claimed in claim 1, for the transmission of binary pulse signals in a prescribed transmission band within which the pulses coincide with the pulses of a clock signal having a given clock frequency, said pulse signals being modulated in a modulator on a carrier, whilst pilot signals are co-transmitted with the pulse signals modulated on the carrier signal, characterized in that the modulator is constituted by a dual single sideband modulator comprising two parallel-arranged channels binary pulse signals being applied to said channels, each channel including a coder for converting the applied binary pulse signals into multi-level pulse signals, while a lowpass filter and a single sideband modulator are connected in cascade to the output of each coder, said single sideband modulators being controlled by mutually different carrier signals having frequencies located on either side of the center of the transmission band, the outputs of said single sideband modulators being applied to a combination device to produce a dual single sideband signal constituted by the two single sideband signals at the outputs of the single sideband modulators and having a frequency space left around the center of the transmission band for the transmission of two pilot signals, the ratio of the clock frequency and the frequency difference of the two pilot signals being given by an integer.

3. A transmitter as claimed in claim 2, characterized in that the carrier signals are applied to the dual single sideband signal as pilot signals.

4. A transmitter as claimed in claim 2, wherein the carrier signals are derived from the clock signal and a fixed oscillator whose frequency is equal to that of one of the carrier signals, while the second carrier signal is derived through an output filter from a mixer stage to which the output signal from the fixed oscillator and the frequency-divided clock-signal are applied.

5. A transmitter as claimed in claim 2, wherein the coder is constituted by a pseudo-ternary code converter having a transmission characteristic in which spectral zeros occur at frequencies given by half the clock frequency of the pulse signals applied to the pseudo-ternary code converter and multiplied by an integer.

6. A transmitter as claimed in claim 2, wherein the coder includes a pulse group analyzer having parallel arranged output lines and which analyses consecutive pulse groups of the binary pulse signal, each output line including a pseudo-ternary code converter having a transmission characteristic in which spectral zeros occur at frequencies given by half the clock frequency of the pulse signals applied to the coder and multiplied by an integer, $m-1$ output lines including an amplitude control device in cascade with the pseudo-ternary code converter, said output lines being applied to a linear combination device to produce a multi-level pulse signal within which the pulses assume $2m+1$ levels.

7. A transmitter as claimed in claim 2, wherein the binary pulse signals applied to the parallel-arranged channels are derived from a signal pulse source through a series-parallel converter.

8. A transmitter as claimed in claim 7 for the transmission of pulses in the base group of a carrier telephony system, wherein frequency cut-off filters are connected to the output circuits of single sideband modulators in the two channels of the dual signal sideband modulator, said cut-off filters being tuned to the frequencies of the internationally standardized pilot signals transmitted in the base group of the carrier telephony system.

9. A receiver suitable for use in a transmission system as claimed in claim 1, said receiver comprising a demodulator for demodulating a received pulse signals, a pulse regenerator, means to couple the output signal of the demodulator to the pulse regenerator, and a pilot circuit in which the received pilot signals are selected so as to generate a local carrier and clock signal, said demodulator comprising by a dual single sideband demodulator comprising two single sideband demodulators the received dual single sideband signal being applied to each of said single sideband demodulators, each single sideband demodulator being controlled by a local carrier signal, said carrier signals having mutually different frequencies, a decoder controlled by a local clock signal which together with the two local carrier signals is derived in the pilot circuit from the received pilot signals and means to couple the output of each of the single sideband demodulators to the decoder.

10. A receiver as claimed in claim 9, wherein the pilot circuit includes two selection filters, the received dual single sideband signal being applied to each of said filters for selecting said pilot signals to demodulate from which the two pilot said receiver dual single sideband signal said selected pilot signals being applied to a mixer stage for recovering the clock signal said mixer stage having an output line including a cascade arrangement of a selection filter and a frequency multiplier.

11. A receiver as claimed in claim 9, wherein the decoder is constituted by a two-phase rectifier whose output line incorporates a pulse regenerator controlled by the local clock signal.

12. A receiver as claimed in claim 9, wherein the decoder is constituted by a series arrangement of a two-phase rectifier and a level separator controlled by the local clock signal, said cascade arrangement being provided with m parallel arranged output lines from which binary pulse series are derived which are applied to a pulse group shaper controlled by the local clock signal, said pulse group shaper converting the pulse signals applied through the parallel arranged output lines of the series arrangement to the pulse group shaper into consecutive pulse groups so as to generate the original pulse series applied to the coder in the transmitter.

13. A receiver as claimed in claim 9, wherein the output lines of the decoders are connected to a parallel-series converter from whose output the original binary pulse signals are derived.

* * * * *